US008513610B2

(12) United States Patent
Lentering et al.

(10) Patent No.: US 8,513,610 B2
(45) Date of Patent: Aug. 20, 2013

(54) DETECTOR SYSTEM WITH POSITIONING SYSTEM

(75) Inventors: Ralf Lentering, Solingen (DE); Kai Ruhnau, Solingen (DE)

(73) Assignee: ICx Technologies GmbH, Solingen (DE)

( * ) Notice: Subject to any disclaimer, the term of this patent is extended or adjusted under 35 U.S.C. 154(b) by 977 days.

(21) Appl. No.: 12/502,496

(22) Filed: Jul. 14, 2009

(65) Prior Publication Data

US 2010/0006763 A1    Jan. 14, 2010

(30) Foreign Application Priority Data

Jul. 14, 2008   (EP) .................................... 08012719

(51) Int. Cl.
*G01T 1/20*   (2006.01)
(52) U.S. Cl.
USPC ...................................... 250/361 R; 250/369
(58) Field of Classification Search
USPC ............................................ 250/361 R, 369
See application file for complete search history.

(56) References Cited

U.S. PATENT DOCUMENTS

| | | | |
|---|---|---|---|
| 5,712,482 A * | 1/1998 | Gaiser et al. | 250/363.08 |
| 7,233,781 B2 * | 6/2007 | Hunter et al. | 455/404.1 |
| 7,429,736 B2 * | 9/2008 | Antanouski | 250/370.09 |
| 2005/0029460 A1 | 2/2005 | Iwatschenko-Borho et al. | |
| 2007/0295904 A1 * | 12/2007 | Antanouski | 250/336.1 |
| 2008/0048123 A1 | 2/2008 | Larsson et al. | |
| 2009/0146073 A1 * | 6/2009 | Stein et al. | 250/370.11 |

FOREIGN PATENT DOCUMENTS

| | | |
|---|---|---|
| GB | 2158572 A | 11/1985 |
| WO | 2004073326 A2 | 8/2004 |
| WO | 2007009495 A1 | 1/2007 |
| WO | 2007082128 A2 | 7/2007 |

OTHER PUBLICATIONS

Keiichi Ooi, et al, Nuclear Facility Radiation Monitoring System, Fuji Electric Review, pp. 114-117, vol. 53, No. 4, 2007.
Kaoru Masui, et al, Portable Radiation Monitor, Fuji Electric Review, pp. 122-126, vol. 53, No. 4, 2007.

* cited by examiner

*Primary Examiner* — David Porta
*Assistant Examiner* — Mindy Vu
(74) *Attorney, Agent, or Firm* — IP Strategies

(57) ABSTRACT

Provided is a detector module for measuring one or more types of radiation, in particular X-ray, gamma ray, or nuclear particle radiation, comprising a detection unit, an analog-to-digital converter, an information processing device, and a memory device for storing the position of the detector module. The detector module comprises at least one light-emitting diode (LED), optically connected with the detection unit for stabilizing the detector unit. Further, the invention provides a stanchion, in particular a portable stanchion, whereby the stanchion comprises a inventive detector module. Yet further, a (wireless) network of detector modules is provided, whereby each detector module is mounted within a stanchion.

16 Claims, 3 Drawing Sheets

DETECTOR SYSTEM WITH POSITIONING SYSTEM

FIELD OF THE INVENTION

This invention relates to a detector module for the measurement of one or more types of radiation, preferably X-ray, gamma, or nuclear particle radiation, comprising a detection unit consisting of a scintillation detector and a photodetector providing electronic pulses with a known relation to the intensity of the light produced by the scintillation detector, an analog-to-digital converter (ADC) coupled to the photodetector, where the ADC converts the analog output signal of the photodetector to a digitized radiation signal, and an information processing device coupled to the ADC, whereby the information processing device performs a method of calibrating, stabilizing and linearizing the digitized radiation signal.

Further, the present invention relates to an analysis device for analyzing digital data, preferably provided by a detector module. Yet further, the present invention relates to a detector system for detecting one or more types of radiation, preferably X-ray, gamma, or nuclear particle radiation, comprising at least one detector module and an analysis device.

BACKGROUND OF THE INVENTION

Detector systems consisting of a detector module and an analysis device are well known in the prior art. With the techniques known in the prior art, it is possible to provide a compact detector system for the measurement of ionizing radiation.

However, the known detector systems show the disadvantage, that in order to observe a number of different locations or places a number of detector systems are required. Using several detector systems in turn has the disadvantage that a centralized surveillance of different locations is not possible or requires additional technical equipment. Further, providing several, for example distributed detector systems requires additional knowledge about the position of the detector systems, in particular when mobile, portable and/or hand-held detector systems are used.

BRIEF SUMMARY OF THE INVENTION

It is a purpose of the present invention to provide a detector system in order to enable a centralized surveillance or observation of a number of places using a number of detector systems. It is another purpose of the invention to provide a detector system, which allows observing a single location or place using a number of different detector systems, whereby analysis of the measurement can be performed remotely, i.e. centralized. Further, there exists a need of providing mobile and/or portable detector systems, whereby the actual position of the detector systems should be provided to an analysis device for analyzing purposes.

According to the invention, a detector system for detecting one or more types of radiation, in particular X-ray, gamma, or nuclear particle radiation is provided, comprising at least one detector module and an analysis device. Furthermore, a stanchion, in particular a portable stanchion having a communication network interface is provided. The stanchion may house an inventive detector module.

The detector module for measuring one or more types of radiation, in particular X-ray, gamma, or nuclear particle radiation may comprise a detection unit consisting of a scintillation detector and a photodetector providing electronic pulses with a known relation to the intensity of the light produced by the scintillation detector, an analog-to-digital converter (ADC) coupled to the photodetector, whereby the ADC converts the analog output signal of the photodetector to a digitized radiation signal, an information processing device coupled to the ADC, whereby the information processing device performs a method of calibrating, stabilizing and linearizing the digitized radiation signal, and a memory device for storing the position of the detector module.

Thus, a detector module is provided which enables analyzing the measurement of the detector module based on the actual position of the detector module. The knowledge about the position of several detector modules has the advantage that, by by using specialized algorithms, a position of a radiation source, which is measured by several detector modules, can be determined.

In a preferred embodiment, the detector module may comprise a location determination system for obtaining the position of the detector module to be stored in the memory device. The location determination system may be a Global Navigation Satellite System (GNSS) or a Radio Navigation System (RNS).

This show the advantage that the position stored in the memory device represents the actual position of the detector module, even if the position of the module has been changed. Additionally to GNSS or RNS the detector module may comprise a gyroscope, such as a micromachined gyroscope. Thus, the position of a moving detector module can be determined even if the GNSS-Signal or a RNS-Signal is nor available.

In a further preferred embodiment, the detector module may comprise a communication interface. The communication interface may be at least one of a wireless communications interface, e.g. WLAN, WiMAX, WiFi, or Bluetooth, and wired communications interface, e.g. Ethernet interface or USB interface, and a combination thereof. The information processing device may perform a method of transmitting the calibrated, stabilized, linearized and digitized radiation signal via the communication network interface to an analysis device.

Thus, analyzing the measurement of the detector module may be performed remotely from the detector module, e.g. centralized. A centralized analysis of the measurement allows also the determination of the position of a radiation source.

In another preferred embodiment, the information processing device may comprise a further memory device for storing the digitized, calibrated, stabilized and linearized radiation signals. The method of calibrating, linearizing and stabilizing the digitized radiation signals may advantageously comprise a step of storing the calibrated, stabilized and linearized, and digitized radiation signal into the memory device. Storing the radiation signals may prevent loss of data when the data transmission to the analysis device is interrupted or out of order. Upon reestablishing the connection to the analysis device, the stored signals may be transferred to the analysis device.

In a further embodiment, the information processing device may perform, prior to the method of transmitting the calibrated, stabilized, linearized, and digitized radiation signal, a method of encoding one or more calibrated, stabilized, linearized, and digitized radiation signals into a predetermined data structure. The data structure may comprise at least a header section and a data section.

The header section may include at least one of a timestamp, detector identifier, sequence number, detector settings, and the detector position stored in the memory device. The data section may include a number of calibrated, stabilized, linearized, and digitized radiation signals.

Thus, by providing a detector identifier, the signals of several detector modules may be discriminated by the analysis device. Further, by using the detector position the position of the radiation source can be determined by the analysis device.

In a further preferred embodiment, the detector module may comprise at least one light-emitting diode (LED), preferably a pulsed LED optically connected with the detection unit. The LED pulses may cause generation of electronic LED-pulses by the photodetector, the ADC may convert the analog LED-pulses of the photodetector to a digitized LED-signal, and the method of calibrating, linearizing and stabilizing the digitized radiation signal may use the digitized LED-signal for calibrating, linearizing and stabilizing the digitized radiation signal.

The method of calibrating, linearizing and stabilizing the digitized radiation signal may perform at least the steps of
identifying the digitized LED-signal by pulse shape analysis,
determining a number of calibration and stabilization parameters, and
applying the determined calibration, linearization and stabilization parameters to the digitized radiation signal.

Thus, an LED-stabilized and calibrated detector module is provided. Radioactive radiation sources are no longer required for stabilizing and calibrating the detector module.

According to the present invention, a stanchion is provided, which comprises means for housing a network compatible device, in particular a radiation detector, and a communication network interface. The communication network interface is adapted for connecting network compatible devices.

In a preferred embodiment of the invention, the network compatible device may be a detector module. The detector module may be mountable within the portable and unobtrusive stanchion and connectable with the network communication interface of the stanchion, such that the detector module is not visible from the outside.

The detector module mountable within the stanchion may be a detector module for measuring one or more types of radiation, in particular X-ray, gamma, or nuclear particle radiation may comprise a detection unit consisting of a scintillation detector and a photodetector providing electronic pulses with a known relation to the intensity of the light produced by the scintillation detector, an analog-to-digital converter (ADC) coupled to the photodetector, whereby the ADC converts the analog output signal of the photodetector to a digitized radiation signal, an information processing device coupled to the ADC, whereby the information processing device performs a method of calibrating, stabilizing and linearizing the digitized radiation signal.

It may also comprise a memory for storing the position of the detector module, as well as a location determination system as described above.

Further, the stanchion may comprise a power source, preferably an accumulator or a battery.

In a preferred embodiment of the invention, the detector module is mounted inside the stanchion such that the detector module is not visible from the outside. Thus, a detector module is provided which can be used in environments where measurements of radiation source should be performed without the knowledge of the people, for example in airports, security entrance and the like.

Furthermore, the stanchion (i.e. the housing of the stanchion or parts of the housing) may serve as an antenna when the detector module provides the calibrated, stabilized, linearized and digitized radiation signal via wireless communication means. Thus, not additional antenna equipment is required.

BRIEF DESCRIPTION OF THE DRAWINGS

A specific embodiment of the invention is described on the basis of the following figures.

DETAILED DESCRIPTION OF THE INVENTION

Figure 1:
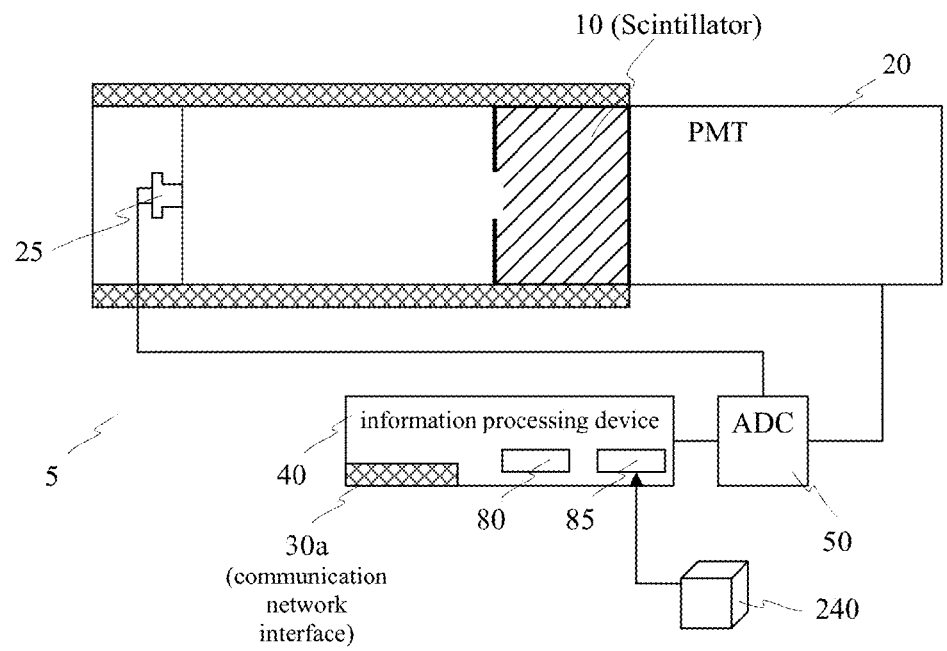
FIG. 1 shows an exemplary embodiment of a detector module, comprising scintillator crystal, a photo multiplier tube, a LED, an analog to digital converter and an information processing device.

In FIG. 1, the main elements of a detector module can be seen, that is
a) a detector unit 5 consisting of scintillation crystal 10, a photomultiplier 20 with a photocathode, serving as a light detector, and an LED 25, used for stabilizing the detector unit,
b) an information processing device 40 coupled to an analog to digital converter (ADC) 50,
c) a memory device 85 for storing the position of the detector module,
d) a communication network interface 30a, and
e) an (optional) location determination device, such as Global Positioning System (GPS) or the like.

Radiation (e.g. γ-radiation) enters the scintillation crystal 10 and is absorbed within this scintillation crystal. An excited state, following the absorption from the radiation, decays under the emission of light. The light is then directed to the photocathode, which, as a consequence of the light absorption, is emitting electrons. The resulting electric signal is amplified within the photomultiplier 20 and then forwarded to the detector electronics (not shown in FIG. 1).

In parallel, an LED 25 emits light, which passes the photomultiplier 20 when mounted within the photomultiplier 20 or passes the scintillation crystal 10 when mounted outside the photomultiplier as illustrated in FIG. 1. The emitted light is being absorbed by the photo cathode. The LED 25 preferably is operated in a pulsed mode; the resulting signals do have mainly rectangular shape.

In order to stabilize the detector module the radiation-induced signals and the LED induced signals have to be separated from each other. In order to separate those signals, the measured signals are digitized in a first step by the ADC 50.

The digitized signals are analyzed (e.g. the pulse height and/or the pulse shape) which allows separating the LED induced pulses from the radiation induced pulses.

In an additional step, the digitized radiation signal can be stabilized if necessary.

Further, the digitized radiation signals are linearized. Linearizing the signals independently in every detector module has the substantial advantage that the subsequent processing and/or analysis of the signals can be simplified and accelerated. For example, a number of linearized digitized radiation signals coming from different detector modules can be added easily (e.g. by an analysis device) without any additional adjustment of the signal. Further, a matching process can be performed more efficient when the radiation signals to be matched are provided in a linearized form. An example of a matching process is given below with reference to FIG. 3.

Analyzing, stabilizing and linearizing are performed by the information processing device 40, which is coupled to the ADC 50. The information processing device 80 may perform several other tasks, such as assigning an unique identifier to the signal or encoding the signal into a structured data format.

Further, the information processing device is coupled to a memory device 80, particularly for storing the digitized radiation signals. Thus, measurements of radiation signals can be performed without a subsequent step of analyzing the measurements. For this purpose, it is advantageous to store additionally a timestamp along with the stored radiation signals.

The information processing device provides a further memory device 85 for storing the position of the detector module. The position can be stored manually, e.g. via the below described network interface 30. In order to provide a more flexible detector module regarding the stored position, the module is connected to a location determination system 240. The location determination system 240 provides the information processing device the actual position of the detector module. The actual position can be stored in the memory device 85. Storing the actual position in a memory device has the advantage, that the position can be updated once after the detector module has been moved. The update process can be initiated manually or by electronic devices which are able to determine the movement of the detector device, such as a gyroscope.

The location determination device 240 can be a Global Positioning System (GPS), a Radio Navigation System or any other suitable system for determining the location of the detector module.

In a further embodiment, additionally to the location determination system, a gyroscope, preferable a micromachined gyroscope (not shown in FIG. 1) can be connected to the information processing device 40 or to the location determination system 240. The micromachined gyroscope can be used to determine the actual position of the detector module (by deriving the actual position from the last measured position) even if the GNSS-Signals or RNS-Signals are not available. This may be necessary for example in airports or security entrances and building where the required GNSS-Signals or RNS-Signals are often not available.

Furthermore, the detector module has a communication network interface 30*a*, which can be a part of the information processing device 40, as shown in FIG. 1. The communication network interface can be a wireless communications interface, e.g. WLAN, WiMAX, WiFi, or Bluetooth, or a wired communications interface, e.g. Ethernet interface or USB interface.

The calibrated, stabilized, and digitized radiation signals are transmitted via the communication network interface 30*a* to an analysis device.

In a further embodiment, raw data of the digitized radiation signals (i.e. radiation signals which are not calibrated, stabilized and linearized) can be transmitted via the interface 30*a*. Thus, expensive and complex calculations can be performed by device which receives the transmitted data.

Prior to transmitting the digitized radiation signals to the analysis device 60, the radiation signals are encoded into a predetermined data structure. The data structure may comprise a header section and a data section. Preferably, the header section may hold an unique identifier (which can be the Media Access Control (MAC) address of the detector module) and the position of the detector system stored in the memory device 85 or acquired directly from the location determination system 240. The data section may hold the calibrated, stabilized, linearized, and digitized radiation signals. Each other data structure suitable for storing the at least the position and the identifier of the detector module as well as the calibrated, stabilized, linearized, and digitized radiation signals can be used, e.g. an XML-based data structure or an structured file.

It has to be mentioned, that storing the signals and transmitting the signals via the interface can be performed asynchronously.

As a result, the inventive detector module provides a digitized, calibrated, stabilized and linearized radiation signal, which can be transmitted via a communication interface to an analyzing device for further processing.

Figure 2:
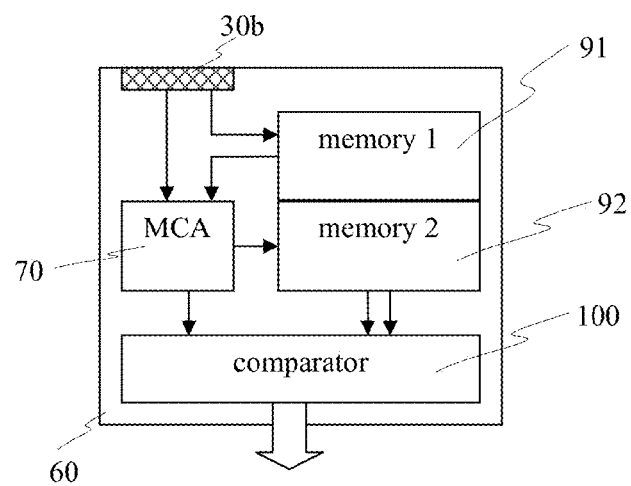
FIG. 2 shows an exemplary embodiment of an analysis device.

FIG. 2 shows an example of an inventive analysis device 60, consisting of a) a communication network interface 30*b* for receiving digital data, preferably calibrated, stabilized, linearized, and digitized radiation signals corresponding to one or more types of radiation, in particular X-ray, gamma, or nuclear particle radiation, form at least one detector module as described with reference to FIG. 1,
 b) a sorter 70, preferably a multi-channel analyzer (MCA) for generating energy spectra using the received digital data,
 c) a first memory device 91 and a second memory device 92, and
 d) a comparator 100.

The data sent by the detector module over the interface 30*a* is received by the interface 30*b* of the analyzing module. The digitized data is forwarded to the MCA in which an energy spectrum according to the received data is generated. Additionally, the received data can be stored in a first memory device 91. This may be required for example if a revision-safe archiving is required or if the received data are required for further analysis.

In one embodiment, the first memory device 91 can be used for buffering the received data if the MCA 70 is not able to sort the received data in a rate as they is provided by the interface 30*b*.

Upon generating the energy spectrum, this can be stored in a second memory device 92. It is to be noted, that an energy spectrum can be stored with the memory device 92 even if generating the spectrum is not yet finished.

It has to be mentioned, that in further embodiment of the invention, a single memory device can be used for storing the received data and the generated energy spectrum or energy spectra.

For analyzing purposes, the generated energy spectrum is forwarded to a comparator, which is able to compare the energy spectrum with a number of predefined energy spectra (template spectra) of known and preferably often detected gamma decay schemes. A number of template spectra can be stored in the memory device 92 (or 91). The comparator 100 requests at least one of the stored template spectra and compares the requested spectrum with the spectrum forwarded by the MCA 70. If the requested spectrum matches the forwarded spectrum, the analyzing device may put out an alarm signal such as a sound signal.

In a further embodiment of the invention, the analysis device can receive via the interface device 30*b* digital data from a number of different detector modules. If digital data is transmitted wireless, a wireless network of detector modules can be set up, requiring only one analysis device 60. It is advantageous, when the transmitted data comprise an unique identifier (the unique identifier can be for example the Media Access Control (MAC) address, such enabling the analysis device to distinguish between different data of different detectors. As yet described above, the received data can be stored in the memory device 91 for archiving purposes or for buffering purposes.

All the received data are forwarded to the MCA 70, which adds (generates) the received data to an energy spectrum. Thus the generated energy spectrum can represent a spectrum of a single radiation source or of a number of different radiation sources, depending on the location of the different detector modules and the observed area of the modules. As each detector module provides digitized data comprising an unique identifier, the data can be assigned to the respective detector module, and therefore it can be determined which detector modules has measured which radiation source. This may be necessary and/or helpful when adding further analysis features to the detector system.

As the data provided by the detector modules comprise the position of the detector modules, the analysis device 60 can provide the feature of determining the position of the measured radiation source.

Figure 3:
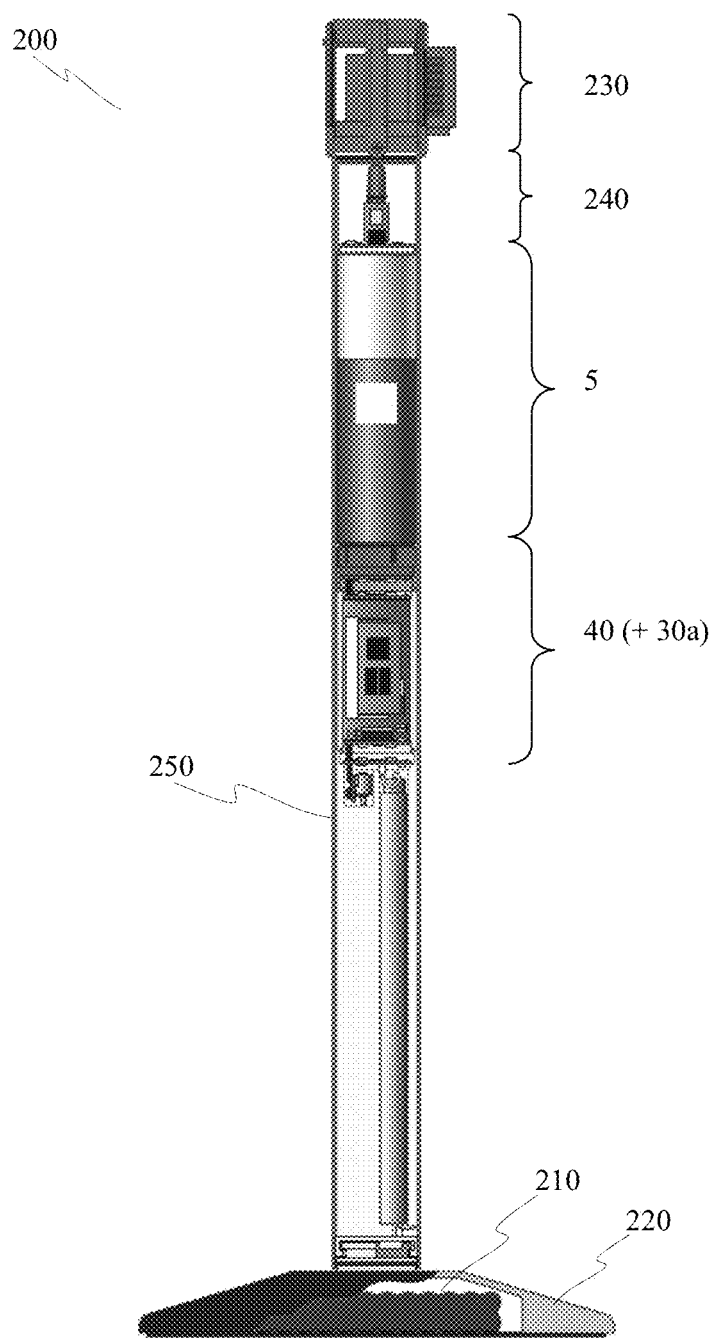
FIG. 3 shows an example of a stanchion with a mounted detector module.

FIG. 3 shows an example of a stanchion with a mounted detector module. The stanchion consists of a support stand 220, a housing 250 and a tape cartridge 230. According to the present invention, the stanchion 200 further comprises a detector module 5, an information processing device 40 including the communication network device 30a and the memory devices 80 and 85. The information processing device 40 is coupled to the detector module 5. Further, the stanchion comprises a location determination system 240 (e.g. a GPS-System with an antenna device). The support stand 220 houses a power source 210, preferably a battery or an accumulator.

Yet further, the stanchion comprises a communication network interface (not shown in FIG. 3). The communication interface of the mounted detector module can be connected with the network communication interface. In one embodiment of the invention, the network communication interface of the stanchion may be Ethernet interface. In a further embodiment, the network communication interface of the stanchion may be any type of wireless communication interface. Thus, a stanchion is provided by the present invention, which can be used for building up a wired or a wireless detector network, independent from the network interface type of the mounted detector module.

The detector module is mounted within the stanchion housing such that the module is not visible from the outside. Further, the housing may provide antenna facilities for the integrated location determination system as well as for the communication network device when the communication network device is operated in a wireless mode. Additionally, the above described gyroscope can be mounted within the stanchion housing.

Figure 4:
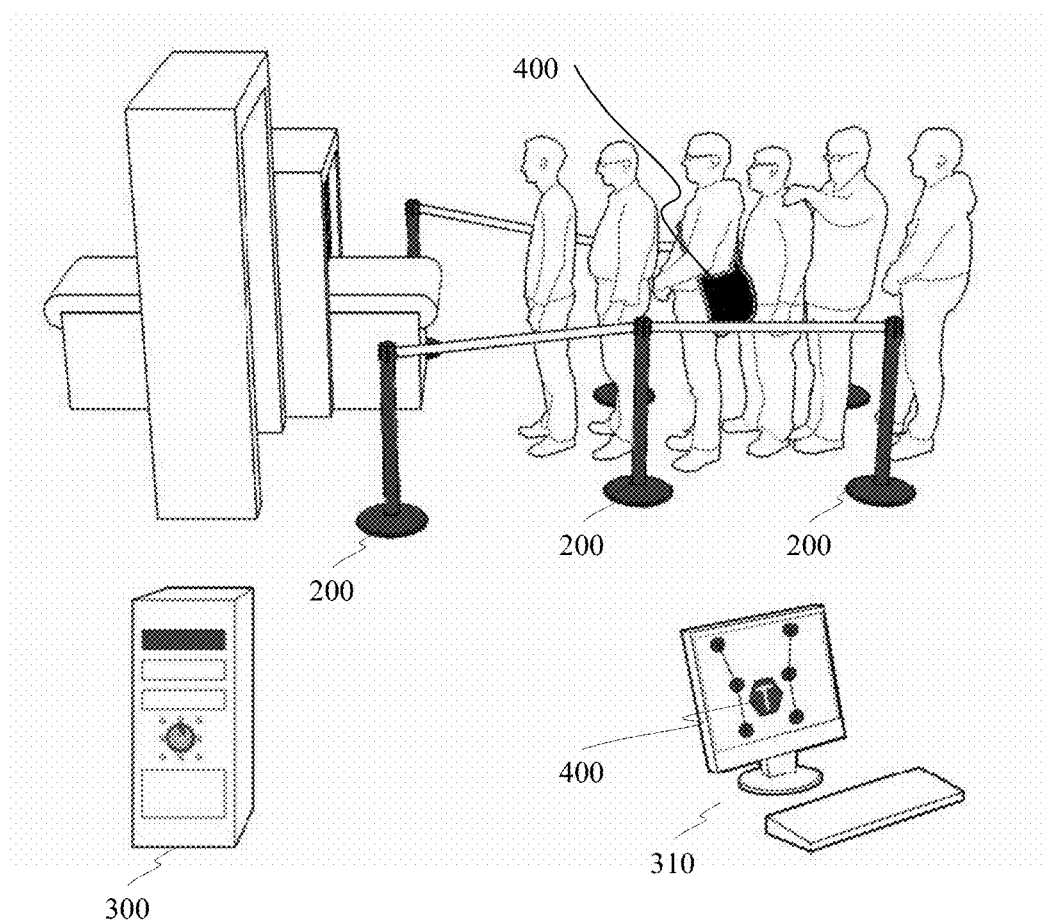
FIG. 4 shows a number of stanchions, a server and a workstation, which provide a wireless network of stanchions, where the position of a radiation source can be determined.

FIG. 4 shows a number of stanchions, a server and a workstation, providing a wireless network of stanchions, where the position of a radiation source is determined.

Using a number of stanchions as described above with reference to FIG. 3, a wireless network of stanchions can be provided. All the stanchions 200 shown in FIG. 4 may provide the detector facilities as provided by the inventive stanchion. Each stanchion 200 is connection via the communication interface 30a to the server 300. Server 300 can be a general purpose computer equipped with the required hardware and software for providing the analysis functionality as described above with reference to FIG. 2.

The server 300 can be connected (wireless or wired) to a workstation 310. Workstation 310 provides visualization devices for visualizing the position of the stanchions as well as the position T of a detected radiation source. In FIG. 4, the position of the bag containing a radiation source is shown at the display. FIG. 4 shows a network of stanchions using six stanchions. Networks, using more or less than six stanchions can be provided. If the feature of determining the position of radiation source should be provided, at least two stanchions should be used for building up stanchion network.

Furthermore, a stanchion can be connected by wire (e.g. Ethernet or the like) with the server or the analysis device. The operating power for the stanchion and the detector module can be provided via PoE (Power over Ethernet). The stanchion may consists of a 2" diameter by 3" long NaI(Tl) scintillation detector surrounded by $^{40}$K (KCl) for calibration verification, a high volume $^3$He detector for neutron detection, DSP based electronics with LED stabilization, and WLAN wireless communication.

Further, a number of different detector modules can be mounted inside the stanchion, thus providing a multi-detector-stanchion. Each detector module may be connected directly via the network communication interface of the module to the analysis device or via the network communication interface of the stanchion. In the latter case, the stanchion may provide a number of network communication interfaces.

The invention claimed is:

1. Detector module for measuring one or more types of radiation, including X-ray, gamma ray, or nuclear particle radiation, comprising
   1. a detection unit consisting of a scintillation detector and as photodetector providing electronic pulses with a known relation to the intensity of the light produced by the scintillation detector;
   2. an analog-to-digital converter (ADC) coupled to the photodetector, the ADC converting the analog output signal of the photodetector to a digitized radiation signal;
   3. an information processing device coupled to the ADC, the information processing device performing a method of calibrating, stabilizing and linearizing the digitized radiation signal;
   4. a memory device for storing the position of the detector module; and
   5. a communication interface which is at least one of a wireless communications interface, e.g. WLAN, WiMAX, WiFi, or Bluetooth, and wired communications interface, e.g. Ethernet interface or USB interface, and a combination thereof:
   wherein the information processing device performs, prior to the method of transmitting the calibrated, stabilized, linearized, and digitized radiation signal, a method of encoding one or more calibrated, stabilized, linearized, and digitized radiation signals into a predetermined data structure whereby the data structure comprises at least a header section and a data section.

2. Detector module according to claim 1, further comprising a location determination system for obtaining the position of the detector module to be stored in the memory device.

3. Detector module according to claim 2, wherein the location determination system is a Global Navigation Satellite System (GNSS) or a Radio Navigation System.

4. Detector module according to claim 1, wherein the information processing device further performs a method of transmitting the calibrated, stabilized, linearized and digitized radiation signal via the communication network interface to an analysis device.

5. Detector module according to claim 1, wherein the detector module further comprises at least one light-emitting diode (LED), wherein
1. the LED pulses cause generation of electronic LED-pulses by the photodetector,
2. the ADC converts the analog LED-pulses of the photodetector to a digitized LED-signal, and
3. the method of calibrating, linearizing and stabilizing the digitized radiation signal uses the digitized LED-signal for calibrating, linearizing and stabilizing the digitized radiation signal by performing at least the steps of
4. identifying the digitized LED-signal by pulse shape analysis;
5. determining a number of calibration and stabilization parameters; and
6. applying the determined calibration, linearization and stabilization parameters to the digitized radiation signal.

6. Detector module according to claim 5, wherein the at least one light-emitting diode (LED) is a pulsed LED optically connected with the detection unit.

7. Detector module according to claim 1, wherein the information processing device Comprises a further memory device for storing the calibrated, stabilized, linearized, and digitized radiation signal and wherein the method of calibrating, linearizing and stabilizing the digitized radiation signal comprises a step of storing the calibrated, linearized, stabilized, and digitized radiation signal.

8. Detector module according to claim 1, wherein the header section includes at least one of a timestamp, detector identifier, sequence number, detector settings, and the detector position stored in the memory device, and wherein the data section include a number of calibrated, stabilized, linearized, and digitized radiation signals.

9. A portable stanchion housing the detector module according to claim 1, and a communication network interface adapted for connecting a network compatible device.

10. Stanchion according to claim 9, wherein the detector module is mounted inside the stanchion such that the detector module is not visible from the outside.

11. Stanchion according to claim 9, further comprising a power source.

12. Stanchion according to claim 11, wherein the power source is one of an accumulator and a battery.

13. Stanchion according to claim 9, wherein the stanchion serves as an antenna when the detector module provides the calibrated, stabilized, linearized and digitized radiation signal via wireless communication means.

14. Detector system for detecting, one or more types of radiation, comprising at least one stanchion according to claim 9 and an analysis device operatively connected with the at least one stanchion for analyzing digital data.

15. Detector system according to claim 14, wherein analyzing digital data comprises determining the location of a radiation emitting source detected by the detector modules of the at least one stanchion.

16. Detector system according to claim 14, wherein the digital data is provided by the detector module of the at least one stanchion.

* * * * *